United States Patent [19]
Marrie

[11] 3,916,637
[45] Nov. 4, 1975

[54] ELECTRICAL DOMESTIC FREEZER
[76] Inventor: Paul A. Marrie, 12, rue Felix Tisserand, 21000 Dijon, France
[22] Filed: Sept. 25, 1972
[21] Appl. No.: 292,121

[30] Foreign Application Priority Data
Sept. 27, 1971 France .............................. 71.34689
Aug. 10, 1972 France .............................. 72.28855

[52] U.S. Cl. .................................. 62/136; 259/122
[51] Int. Cl.² ............................................ A23G 9/00
[58] Field of Search ....... 62/136, 342; 259/DIG. 34, 259/122 X, 153

[56] References Cited
UNITED STATES PATENTS
2,116,924 10/1938 Brace .................................... 62/342
2,793,505 5/1957 Finch .............................. 259/122 X Primary Examiner—William E. Wayner
Attorney, Agent, or Firm—Raymond A. Robic; Peter G. Mack; Arthur Schwartz

[57] ABSTRACT

An electrical domestic freezer characterised by the fact that it is provided with means of connection between the arm and the mixer blade support, the aforesaid means ensuring their relative rotation in order to make the mixer blade pass from the working position, immersed in the preparation to be frozen, to a raised position, enabling the blade to be taken out of the aforesaid preparation.

21 Claims, 19 Drawing Figures

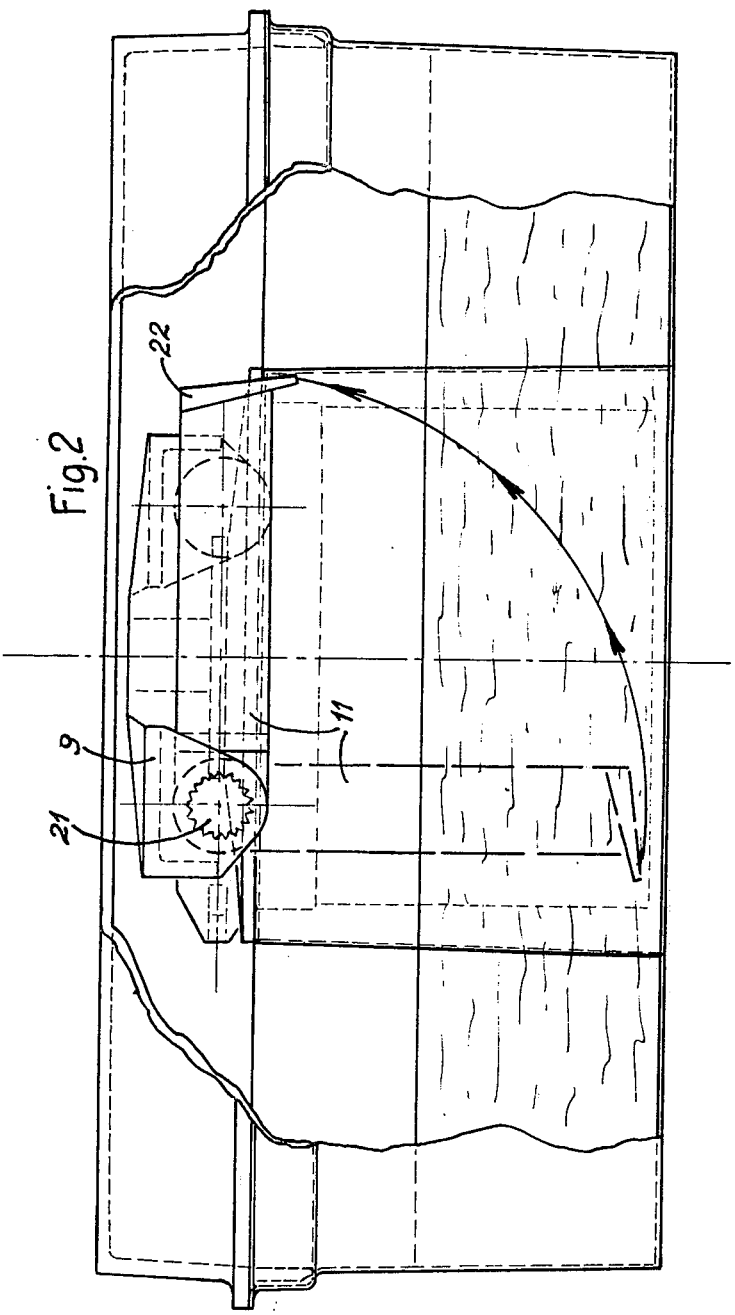

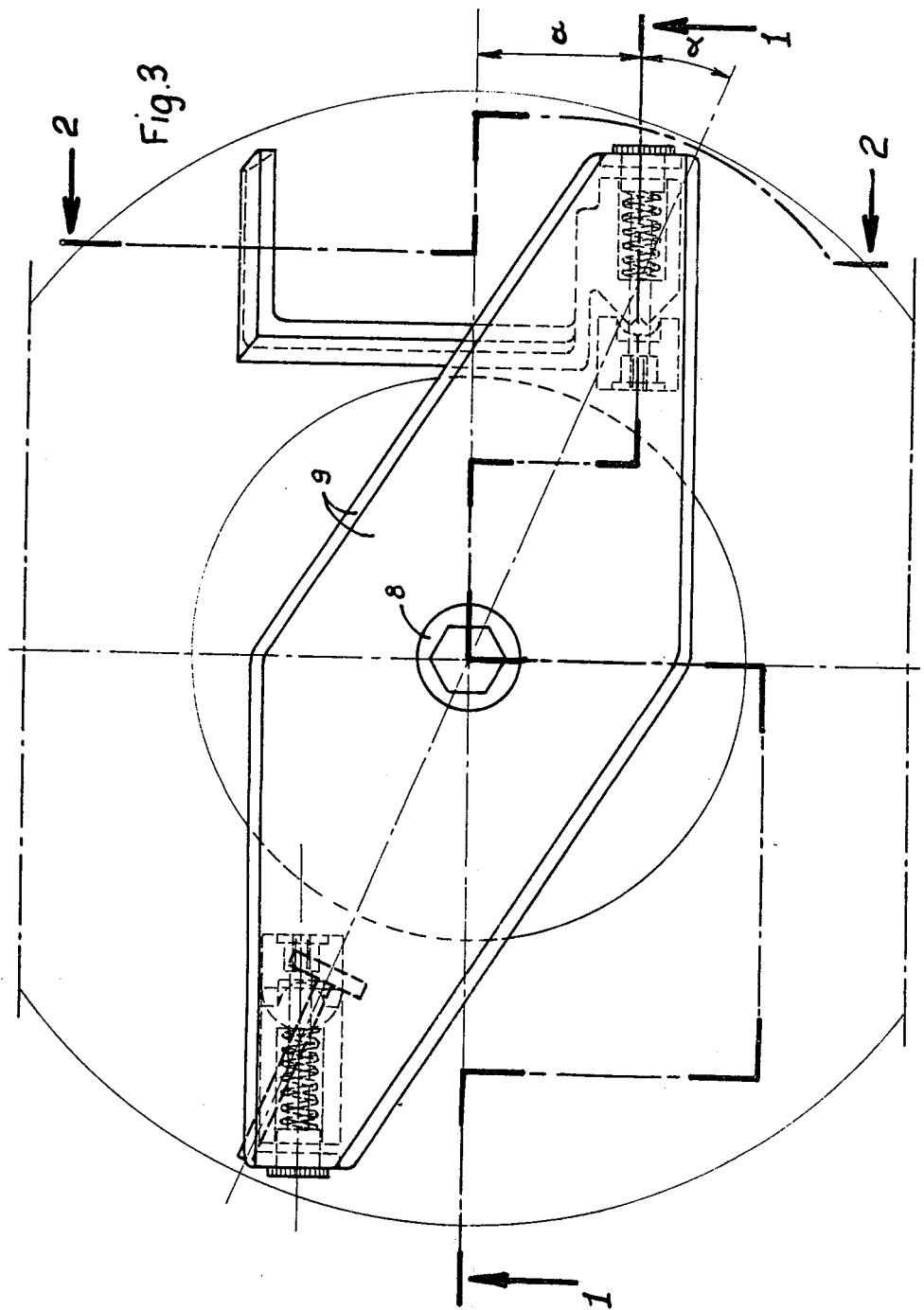

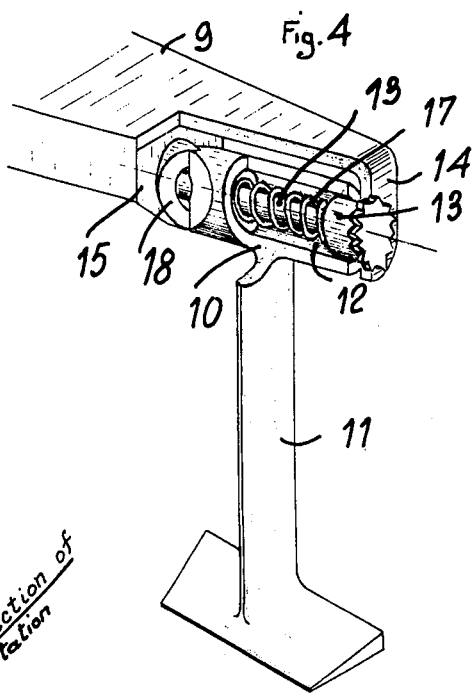
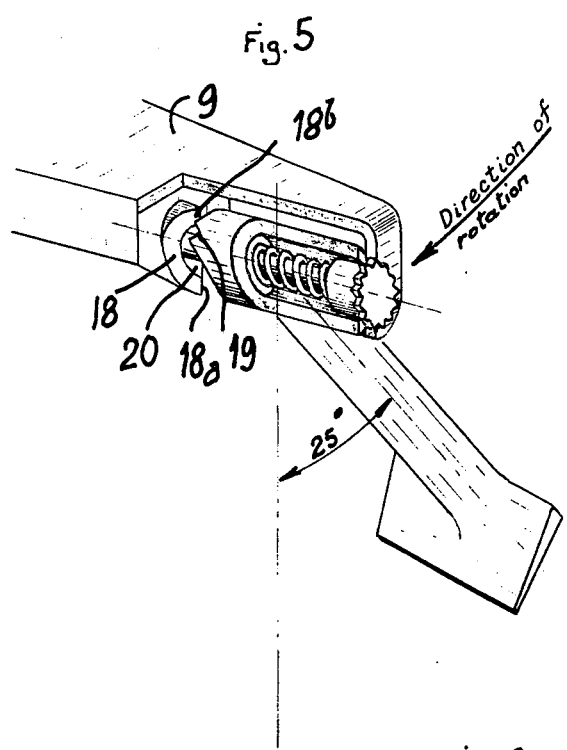
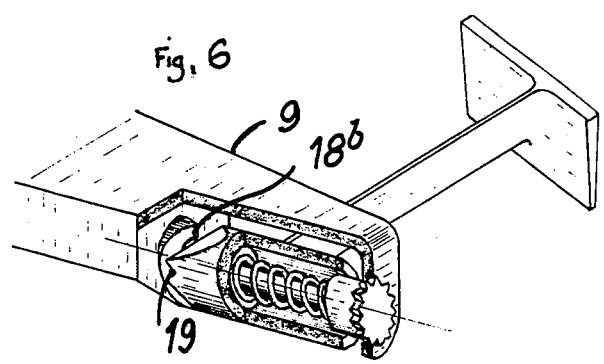

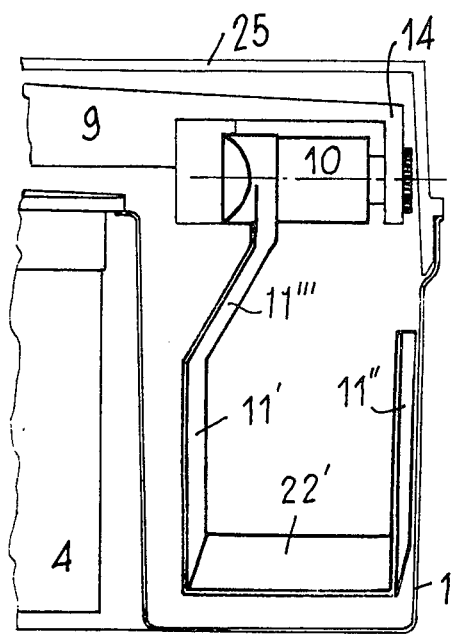
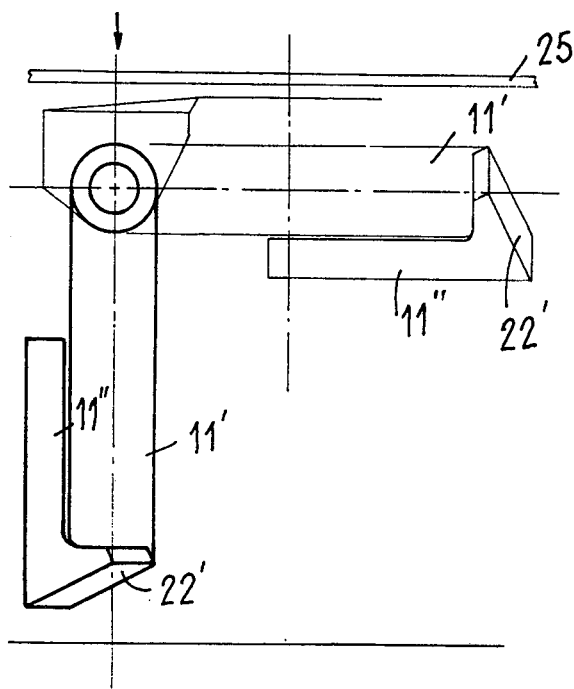
Fig. 8. Fig. 7.
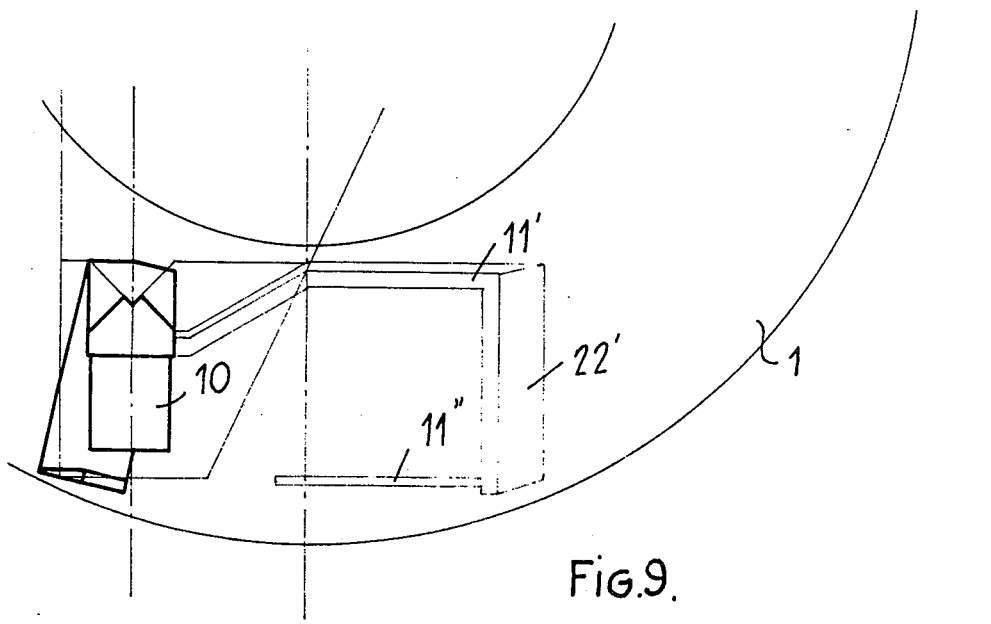
Fig. 9.

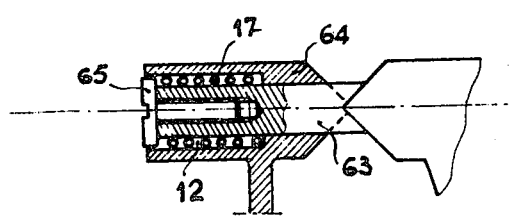
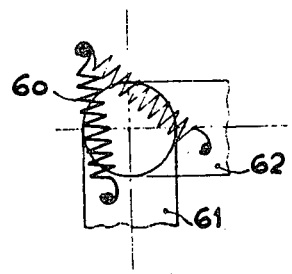
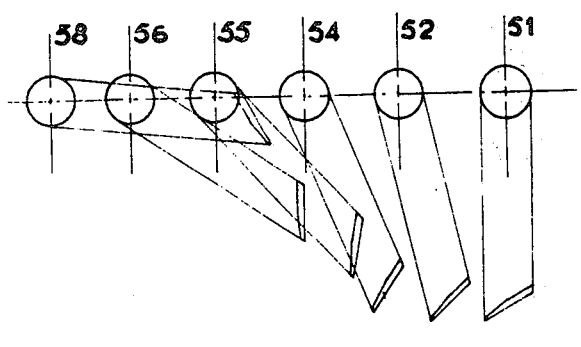
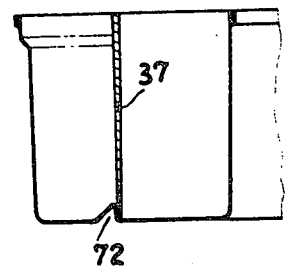
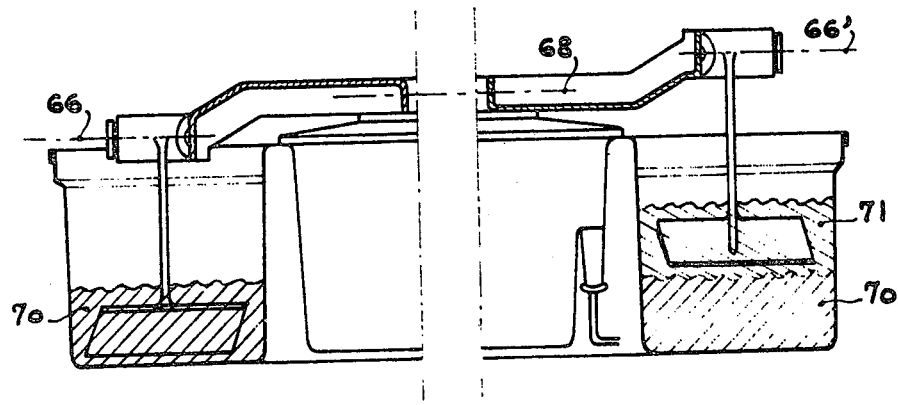

ELECTRICAL DOMESTIC FREEZER

Background of the Invention

The present invention relates to an electrical domestic appliance for the preparation of ice-cream and water-ice in a refrigerator.

Prior Art

There are a number of freezers of various shapes and designs on the domestic electrical appliance market, the basic difference of which lies in the arrangement of the whisking elements, in the motor stopping or protection system, and in the shape of the ice tank.

In most cases, the whisks swivel on themselves along a vertical axis and are connected rigidly to the lid of the container with a mortise joint, this lid acting as the motor-reducer support and casing. When the ice is set, by taking the lid from the device, the whisks come away from their drive shaft and remain locked in the ice.

In another type of device, the motor and whisks occupy a space dropped into the tank, the lid serving only to cover the whole thing.

Another device has an arm swivelling vertically below the axis of the lid. The arm drives a whisk in a circular motion on one side of it, the whisk itself being given a rotating motion. The other end of the arm scrapes the ice as it forms.

In some of these devices the driving motors are such that they can support permanent stalling of the motor without failure when the blades are immobilised by the ice.

In other devices an adjustable torque limiting device enables a micro-contact to be actuated which stops the motor. When the ice sets, under the increase of the torque, a spring mounted swivelling arm acts on a micro-contact.

In these earlier devices, the tanks are generally parallelepiped shaped with rounded angles, or else have semi-cylindrical longitudinal ends. In this case two whisks work with an angular displacement and occupy the whole area of the base quadrilateral.

The tanks can also be round, in the case of an arm driving a whisk in a planet motion, or also ring-shaped when the motor is located in the central part of the tank.

However, all these devices have notable disadvantages.

For all these devices the major disadvantage is the jamming of the mixing blades in the ice, either when the motor is immobilised by the release of the microswitch, or when the motor itself is stalled. It is then necessary to remove the blades from the ice immediately and replace the ice afterwards in the refrigerator to set completely, or else to remove the blades at the time of eating, which spoils the appearance of the preparation. There is, therefore, reason to take action during the course of operation, which in spite of the various methods for protection of the motor, is a serious disadvantage.

In addition, in the majority of the devices at present in use, the motor unit is rigid with the lid and the mechanical system, which makes it very difficult, if not impossible, to clean the latter with water.

An object of the present invention is to remedy these various disadvantages, in particular to remove the whisk blades from the ice as soon as the latter has reached the consistancy required without the formation of crystals at the time of setting.

Brief Summary of the Invention

More particularly, the invention concerns an electro-mechanical device intended for the preparation of ice-creams or fruit water-ices in a family refrigerator, the special characteristic of which lies in the fact that the ice-cream or water-ice whisking elements come out of the ice by themselves when it has reached a point of consistancy such that when it is set, and the preparation has no crystals, whatever the composition of the cream. This special characteristic enables the ice to be left free of any whisk which could remain stuck in it, and avoids the presence of an electro-mechanical device controlling stopping or protecting the motor.

Further Features of the Invention

A further object is to avoid the installation of expensive electrical equipment to stop the motor when the ice begins to set.

The present invention thus enables the preparation to be given a neat appearance which remains very presentable after it is turned out.

It also, by the shape chosen for the tank, enables an ice cake to be obtained which is easy to decorate.

In an embodiment of the device according to the invention, which is designed to be used in conjunction with a refrigerator, the cold producing element of which is a coiled exchanger on which the freezer is rested, the structure of the whisking elements is adapted to prevent the formation of crystals or flakes of ice occurring mainly around the bottom of the freezer tank, since this forms the only exchange surface with the cold producing element. The structure of the whisking elements or blades is like an inclined plane located at the bottom of the tank or a toothed scraper scraping the bottom of the tank to loosen the crystals or flakes of ice which form there, in order to redistribute them into the whole volume of the preparation in the course of setting. The general shape of these whisking elements is that of an L or an inverted T.

Another object of the invention is to provide in a domestic electrical appliance for the preparation of ice-creams and water-ices of the above mentioned type, a structure of the whisking elements adapted to the use of the device in conjunction with a cold air circulation refrigerator fitted with a low temperature (e.g. $-18°c$) storage compartment, the cold supply being obtained from an electric fan placed at the back of the device, blowing or sucking the air through the cold producing element located, as a rule, against the bottom wall, but outside the storage compartment.

In fact, under these conditions, it can be seen that there are no cold walls on which the freezer can be rested as is the case in coiled exchanger refrigerators. The bottom of the tank of the freezer no longer forms the only exchange surface, the vertical lateral sides also participating in the thermal exchange. Formation of ice crystals or flakes can therefore occur on these vertical lateral sides of the freezer tank and as a result a change in the structure of the whisking elements is advisable.

In accordance with one modification of the invention, the whisking elements are designed with a U shaped structure the bridge of which, consisting of an inclined plane, as previously, scrapes the bottom of the freezer tank, and at least one of the arms of which scrapes the corresponding lateral side of the said tank.

The use of the freezer is thus generalised since it can be used in conjunction with any type of refrigerator.

In another aspect of the invention, turning out the ice cake is greatly facilitated if a series of holes is provided in the bottom of the tank, with a diameter too small to allow the liquid to be frozen to flow through when it is put into the tank, but on the other hand allowing atmospheric pressure to be restored by the entry of air into the space, between the bottom of the tank and the ice cake, which is then no longer held by low pressure, but slides easily out of the tank when it is turned upside down, after it has, if necessary, been momentarily warmed by immersion in warm water.

In yet another aspect of the invention a fruit squeezer cone is attached to the freezer and its driving device (motor-reducer) is used to allow 'in situ' preparation of fruit juices to go into the composition of the water-ices, or which may also be drunk as they are.

In yet another aspect of the invention, the tank is equipped with a detachable circular dividing plate which thus forms the boundary of two coaxial rings, the product to be frozen contained in each of these rings being mixed by at least one mixer situated at each end of the arms, so that two ice-creams or water-ices can be made at the same time with different flavours.

In yet another aspect of the invention the blade release devices are installed on shafts which form part of the driving arm. Besides simplifying installation, the clearance required for swivelling of the blades is less than in the first variation described.

In yet another aspect of the invention, the blades, in the position for mixing, occupy the entire available width at the bottom of each ring. When they are being raised, they wedge on the two vertical walls of the ring and this helps their upward motion in the zone in question.

In a further aspect of the invention, the means of connection between the blade supports and arms are arranged on a different plane from that of the driving head, the connection of the arm on to the driving head being reversible. This arrangement enables one preparation to be made at the bottom of the tank and then, by reversing the arm-blades unit, a second preparation to be made on the top of the first.

Brief Description of Drawings

The description which follows, with reference to the accompanying drawings is given as a preferred example, to show how the invention can be put into practice.

In the drawings:

FIG. 2 represents a partial section of the device along the arrows 2—2 of FIG. 3, showing the 'raised' position of the scraper blade and, drawn in a broken line, its working position in the ice, FIGS. 4, 5 and 6 are views in perspective of the whisk raising mechanism;

FIG. 7 is a partial diagrammatic view of the freezer in diametric section, showing the U structure of one of the whisking elements;

FIG. 8 is a side view illustrating the extreme positions which can be reached by the whisking element;

FIG. 9 is a view from above, diagrammatically illustrating the whisking element in the raised position;

FIG. 13 is a diagrammatic view showing the sequence of the blade raising principle;

FIG. 14 is a diagrammatic view of a swivelling device;

FIG. 15 is a section of the hub of a blade;

FIG. 16 is a cross section of the tank equipped with an offset or cranked arm, on the left, with the blade in the low position, on the right, the arm being turned over with the blade in the high position, for making water-ices in two flavours one on top of the other, and FIG. 17 is a partial section of a tank for making water-ices in two flavours.

Description of Embodiment

Figure 1:
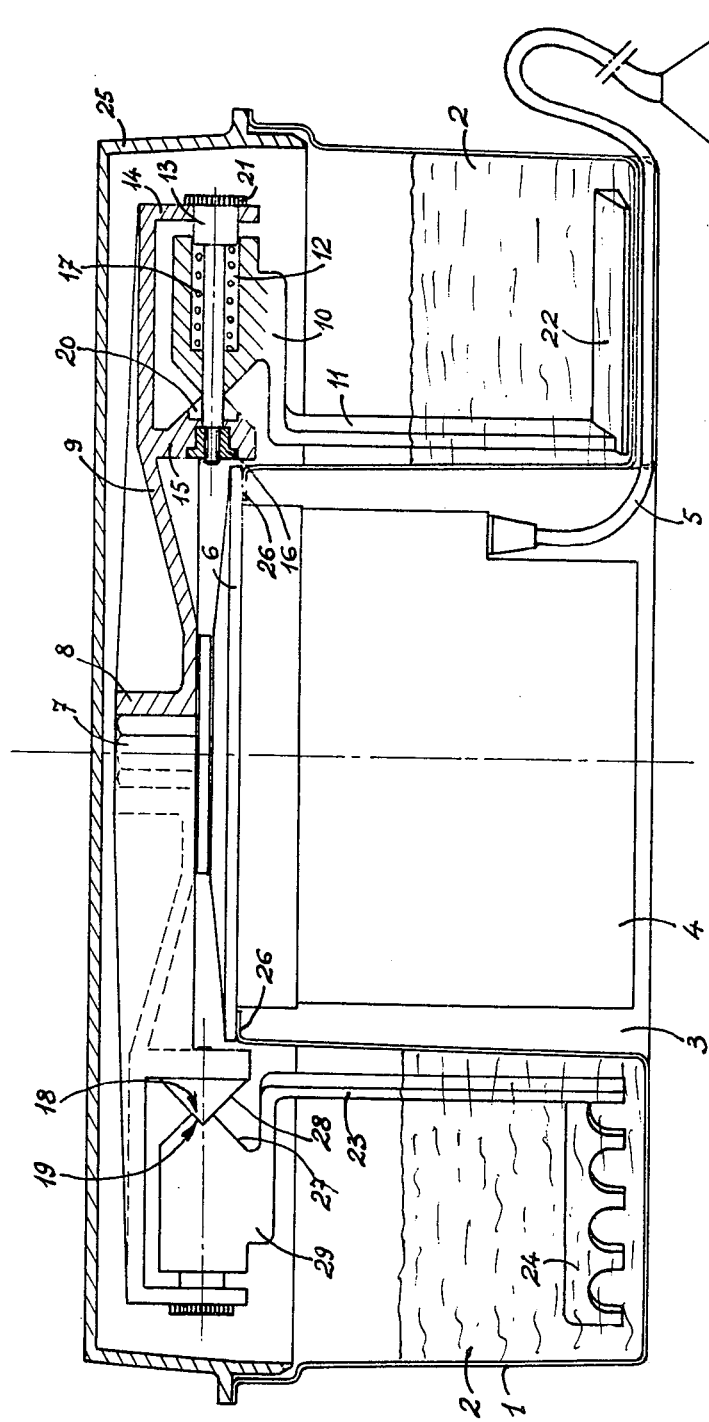
FIG. 1 represents a section of the device along a diameter 1—1 passing through the shaft of the motor, tank and swivelling arm driving the two whisks (FIG. 3, section line 1—1).

In accordance with FIG. 1, a ring-shaped tank 1, made of light metal which is a good heat conductor, forms firstly a circular space 2 and secondly in its central part an empty zone 3 in which a motor-reducer 4 is placed, fed through a electric cord 5.

The motor unit 4 is supported by a ring 6 forming the lid of the motor casing, on a circular rim 26. The apparent axis of the motor reducer ends in a six-sided male piece 7 for receiving a driving head 8 consisting of a six-sided female housing. By means of the head 8, an arm 9 which is rigid therewith is driven round. At each end, this arm has two aligned forks 14 and 15 but the common axis of which is offset between parallel planes by an amount $a$ (see FIG. 3) with respect to the axis of symmetry of the arm.

The fork 15 receives a nut set into plastic and on which is screwed a shaft 13 on which swivels a blade support 10. A cylindrical housing 12 enables a compression spring 17 supported on one side on the cylindrical shoulder of the support and on the other side on the shoulder of the swivel 13, to urge the blade support 10 towards the fork 15. The latter consists of a bevelled-shape element 18 in the form of a hollowed out slice of melon, which guides the blade support 10 into a $V$ shaped slot 19, predetermining a preferential position of the blade support. The blade support 10 is rigid with the arm 11 holding the blade 22. It can be seen from this that a strong force applied on blade 22, creates a torque at the level of the support 10. The two parts 18$a$ and 18$b$ of the conical angle of the bevel 18 tend to come out of the slot 19, compressing the spring 17 and creating an alteration of angle between the parts 18 and 19.

The possibility of greater or lesser ease of rotation of the support 10 depends on the compression force imposed on the spring 17.

The blade support 29 driving the blade arm 23 rigid with the blade 24 is identical in all respects to the support 10 as regards its assembly.

From the start of rotation and release of the bevel 18 from the slot 19, the inclined plane 27 slides on the inclined plane 28 under the effect of the spring, increasing the rotation of the complete arm to a position displaced by substantially 90°. In this position the two lips of the slot 19 are situated in the clearance 20 of the fork 15. The swivel shaft 13 ends in a milled knob 21, enabling the blade arm support to be fitted and removed for cleaning.

Thus, as long as the consistency of the cream to be frozen is inadequate, the arm 11 remains vertical and the blade 22 scrapes the bottom of the freezer. When this consistency has reached a certain degree, the arm 11 puts a brake on the drive along the arm 9, and there comes a moment when this arm 11, forced backwards, pushes the angle edges 18a and 18b out of the slot 19, at the same time compressing the spring 17. Then, the action of this spring coupled with the alteration of angle of the inclined planes 27 and 28, starts the automatic raising of the arm 11 until the sharp edges of the slot 19 fall back into the hollowed out part 20 between the conical parts 18a and 18b of the bevel 18.

Because of this, the blade 22 is completely raised out of the top of the ice-cream which has reached an adequate consistency. The force of the spring 17 is clearly calculated depending on the consistency to be obtained, so that a complete withdrawal of the blades from the ice-cream is obtained.

We have seen above that the axis of the two forks 14 and 15 was offset by an amount a with respect to the symmetry axis of the support arm. This displacement is designed to give the maximum clearance in the swivelling of the blade arm by reason of the round shape of the freezer tank.

The angle of the blade arm and with respect to the blade arm support axis should also be noted. This angle must compensate the displacement of the axis of swivelling of the blade arm with respect to the axis of symmetry of the arm 9. A movement of the blades in the tank is then obtained which is effective at a tangent to the centre of rotation, which ensures steady mixing without any eddying of the preparation to be frozen.

The shape of the blades 22 and 24 is such as to ensure that the preparation is mixed by one at the lowest level of the tank, while the other scrapes the particles already set, redistributing them into the mixture.

In FIGS. 6 to 17, analogous parts or components of the variations described bear the same reference numbers, modified parts or components bearing the same references, but with accents.

According to FIG. 7, two whisking elements with a U structure travel in the ring-shaped tank 1 of the freezer; the bridge 27 of these elements consists of a bevelled inclined plane which scrapes the bottom of the tank, and the sides 11' and 11" scrape the vertical lateral walls of the tank. This U structure is suspended by means of a part 11''' and a blade support 10, being a device identical in all respects to that of the device in FIGS. 1 to 6, comprising the arm 9 fitted at the end with a fork 14 receiving the device, enabling the whisking element to swivel between two positions, one vertical in which it scrapes the walls of the tank, the other horizontal in which it is out of preparation (FIG. 3).

Figure 19:
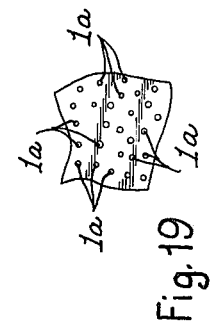
FIG. 19 is a fragmentary plan view of the bottom of the tank shown in FIG. 1.

It has been found advantageous, as has already been mentioned, for turning out the ice cake, to make a series of holes 1a (see FIG. 19) in the bottom of the tank with a diameter insufficient to let the liquid preparation escape, but sufficient to prevent the formation of a low pressure zone between the bottom of the tank and the bottom of the ice cake. Surface melting of the ice cake at the level of the holes 1a when the tank is immersed in warm water enables air to enter, when the tank is turned upside down, to turn out the ice cake. In this way it is extracted easily. The diameter of the holes is of the order of 3/10 mm.

Water-ices being essentially made up of fruit juice and sugar, it is possible to simplify their preparation by attaching to the freezer a fruit squeezer cone (FIG. 10) adapted to the drive, which enables fruit juices to be obtained 'in situ' with a view to preparing water-ices (or even to be drunk as they are).

A fruit squeezer cone 30 includes an internal and axial shaft 31, the bottom of which has a hexagonal shape internally, the cone is situated on the drive 8 of the freezer's motor-reducer. The base of the cone is surrounded by a ring-shaped container 34 with perforations 32, 33 (on the left, FIG. 4) enabling the fruit juices to flow into the tank 1 of the freezer, the pulp being retained in the ring-shaped container. On the right of FIG. 10, the ring-shaped container does not have any perforations, but is fitted with an appropriate pouring lip, the pulp being stopped by a ring-comb 35. In this last case, the juice can be poured into the ring-shaped tank 1 after removal of the cone 30, or else it can be poured into another container to be drunk (if it is not wished to make a water-ice).

Figure 11:
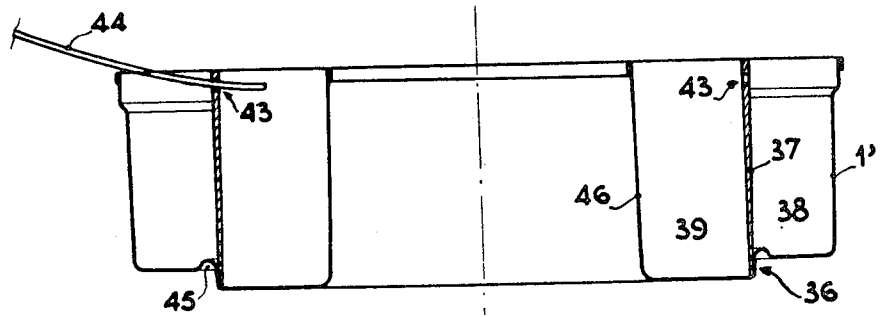
FIG. 11 is a cross section of the tank equipped with its detachable dividing plate.
Figure 12:
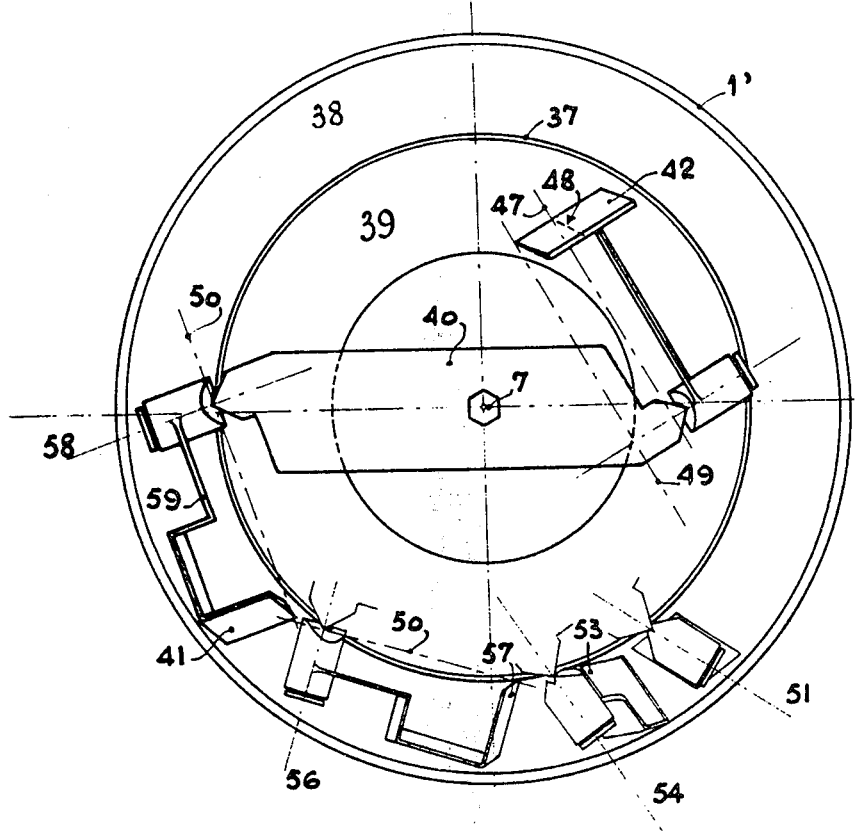
FIG. 12 is a view from above of the freezer equipped with the means for making water-ices in two flavours.

According to FIGS. 11 and 12, the tank 1' has a section such that the bottom area has a vertical raised edge 36. A cylindrical dividing plate 37, preferably made of plastic fits against this raised edge 36 of the tank. This dividing plate can with advantage be constructed with a double taper for the following reasons:

a. in order to facilitate its removal after making ices,
b. to reinforce the top when it is removed,
c. to improve the seal at the joint 36 between the compartments 38 and 39.

The two rings 38 and 39 are preferably equal in volume; because of this compartment 39 is wider than compartment 38.

For this type of freezer, if it is wished to scrape the contents of both tanks 38 and 39 at the same time, the arm 40 must be shaped as shown in FIG. 12, in order to act along different mixing radii for each ring. This arm 40 is turned by a head 7 as in the variation in FIGS. 1 to 6. One blade 41 is arranged in front of of the ring 38, whilst the other blade 42 is arranged in front of of the ring 39.

If it is wished to make an ice-cream or water-ice with two different flavours, after arranging the detachable dividing plate 37, the two preparations are poured successively into each compartment 38 and 39 and the freezer fitted with its arm and motor-reducer is placed in a conservator or in the evaporating compartment of a refrigerator.

If it is wished that the preparations should be joined together after setting, it is necessary after automatic raising of the blades to remove the arm and withdraw the dividing plate 37. If the dividing plate 37 is tightly wedged in the vertical part 36, it will be possible to lever it with the aid of a fork handle 44 for example, (which will have been previously inserted into the openings 43 provided for this purpose), using the edge of the tank 1 as a support.

The space left free between the two preparations after withdrawal of the dividing plate will be occupied by less solid product without, however, the two products being mixed so that the separation at the time of cutting the ice cake will be perfectly clean.

At the time of turning out, since it is necessary to warm the tank momentarily so that the ice cake can slide in it, the surface layer liquifies and the preparation in 36 can flow on to the preparation 38. So that it remains aesthetically pleasing, a step in the form of a circular collar 45 is made in the bottom of the tank, which creates a groove in the ice-cream which is able to recieve the partially liquified preparation coming from the zone 36.

So that the freezer does not have too large a diameter for a given volume of ice-cream (e.g. 1.5 liter), it is necessary to increase the height of the tank, with the result that the rings 38 and 39 are relatively narrow.

In the variation shown in FIGS. 1 to 6, because a wide ring was available, the blades, in their withdrawal movements, described arcs of circles within planes at a tangent to the central shell 46, as shown by reference 47. This arrangement would lead in the present case to narrow blades as shown at 48, which would no longer scrape an adequate width at the tank bottom. In this modification of freezer with two concentric rings, the blades, in their withdrawal movements, describe arcs of a circle in secant planes 49 to the central shell 46, and in secant planes 50 to the dividing plate 37.

The raising principle is as follows (FIG. 13). The blade 51 in the working position is subjected to a strong force due firstly to the viscosity of the preparation which is setting and secondly due to the rotation of the arm. As the viscosity increases, the blade assumes a position such as 52. The corner 53 of the blade (FIG. 12), adjoining the shell of the tank or the dividing plate, moves closer to this until it touches it, and tends because of its turning movement to become wedged, as shown in position 54. The action of the spring 17 (FIG. 4) is then insufficient to cause raising but, by way of compensation, the angular displacement of the arm 40 tends to make the blade 41 wedged against the edge of the dividing plate 47 move upwards through the successive positions 54, 55, 56. As the arm turns, the plane 50 moves progressively and its direction becomes such that the trajectory of the corner 57 of the blade facilitates release. The spring 17 can again play its part and cause completion of raising, and maintain the blade at rest position 58.

It should be noted that this raising principle is only possible if a blade-hub connection 59 is available which is sufficiently flexible to be able to bear the deformation arising due to the momentary crossing of the plane at a secant to the tangent plane defined above. It should also be noted that the hub system described in FIGS. 1 to 6 is used only at the beginning and end of the blade raising trajectory. It can be replaced by the direct action of a spring 60 (FIG. 14) which holds the blade in position 61 during scraping, and then, after raising, keeps it in position 62.

For the reasons of space already mentioned, the height of the arm blade swivel must be the smallest possible so as to reduce the total height of the freezer.

Instead of arranging the turning-axis 13 between two forks 14 and 15, (as described) in the modification of FIGS. 1 to 6, the arm may be lengthened as in FIG. 15 by a cast swivel-pin 63, around which swivels the blade hub 64. The spring 17 is housed in the same chamber 12 as the hub 64, supported on the one hand on the bottom of the chamber, and on the other hand, under the head of a fixing screw 65 screwed into the swivel pin 63. The operating principle is the same as in FIGS. 1 to 6. However, it should be noted that the blade can work in two diametrically opposite positions with respect to the swivel pin 63.

In another modification of freezer shown in FIG. 16, for making ices in two flavours one on top of the other, the swivelling axes of the blades are located on the same horizontal plane offset with respect to the axis of symmetry 68 of the arm. By turning over the arm on the drive sprocket, the height of the plane 66 through which the swivelling axes pass is lowered or raised.

In the position as shown on the left in FIG. 16, the plane 66 is situated under the plane of symmetry 68. The blade can scrape a preparation 70 the level of which corresponds to half the capacity of the freezer. When the preparation is frozen, all that is needed is to turn the arm over on itself, as shown on the right in FIG. 16, and to swivel the blades through 180°. The plane 66 is then above the plane of symmetry 68 of the arm. The difference in height between planes 66 and 66' corresponds to the height defined by half the normal capacity of the freezer. A second preparation 71 in a different flavour can be poured on to the first preparation 70 and mixed without the blades touching the latter.

This second preparation 71 must however be poured cold, in order not to melt the surface of the first preparation 70.

These two types of two flavour freezers can also be used for single flavour ices. For the first (FIGS. 11 and 12) it is enough to leave out the detachable dividing plate 37. For the second (FIG. 16) it is enough to fill the tank to its normal capacity and to arrange the arm so that the swivelling axis is placed below the plane of symmetry 68, of the arm (left of FIG. 16).

The shape given to the bottom of the tank as shown in FIG. 11 can be modified according to FIG. 17 in such a way that both parts of the bottom are inscribed in a single plane, the circular collar 72 ensuring, as before, the fit of the detachable dividing plate 37.

Figure 18:
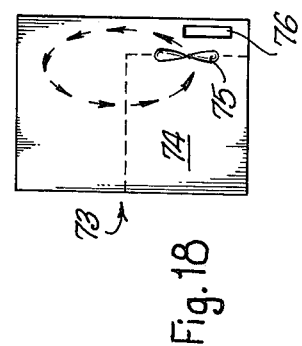
FIG. 18 is a schematic diagram of the cold air circulation refrigerator in conjunction with which the appliance of the invention may be used.
Figure 10:
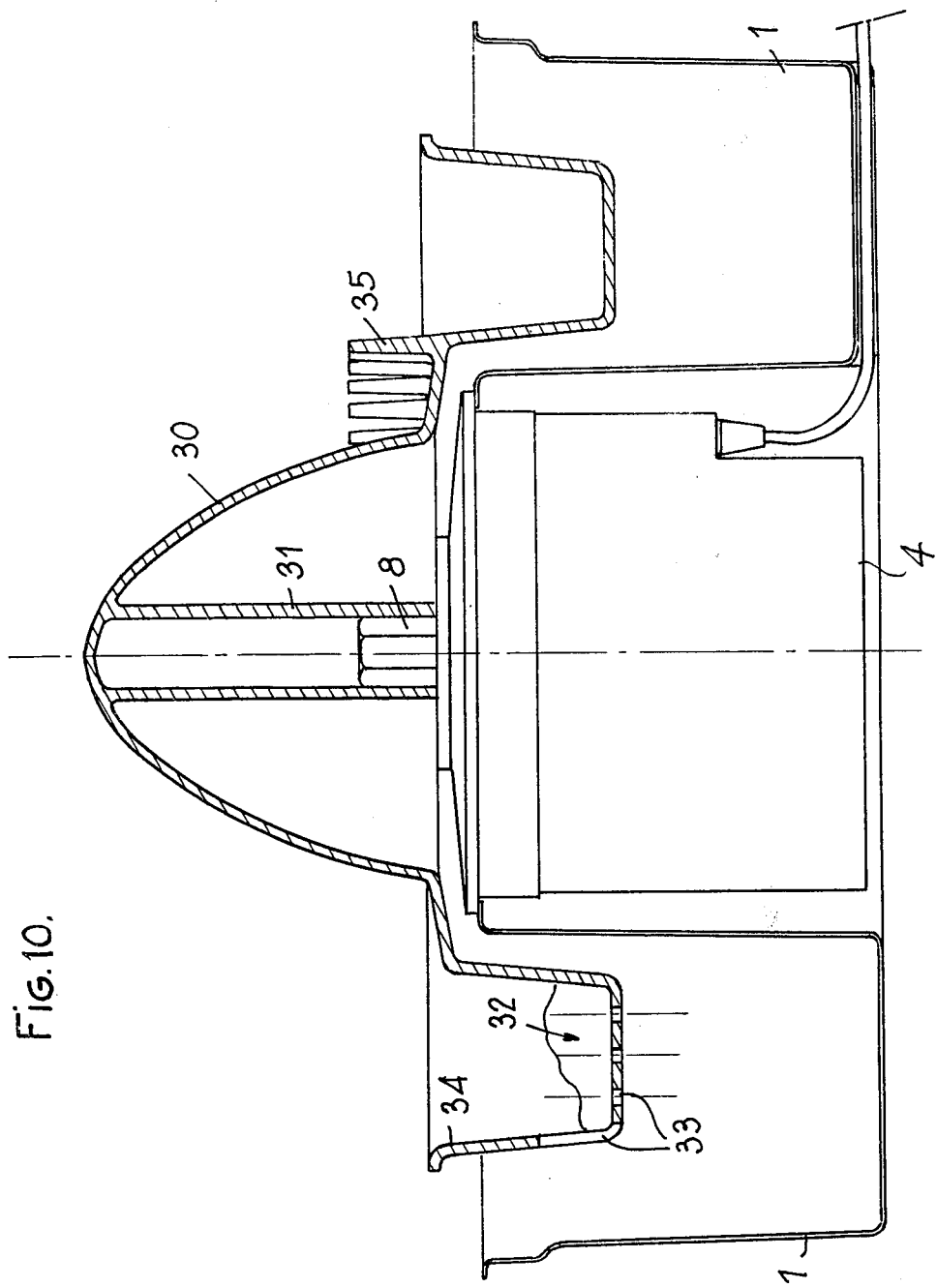
FIG. 10 is a view in diametric section of the freezer connected to a fruit squeezer cone.

As described earlier, the appliance of the invention may be used in conjunction with a conventional cold air circulation refrigerator, and such a refrigerator is illustrated schematically in FIG. 18. As also described earlier, the refrigerator 73 includes a separate low temperature storage compartment 74 which produces freezing temperatures therewithin, and an electric fan 75 which moves air through a cold producing element 76.

I claim:

1. A device for making ice-cream or the like comprising:
   a ring shaped tank;
   a housing at the centre of said tank;
   a motor drive-reduction device in said housing;
   an arm driven by said device;
   a mixer blade support carrying a blade arm for a mixer blade; and
   means mounting the mixing blade support on said arm to cause rotation of the blade around the tank, said means being adapted to permit the blade to be lifted from a working position in which it is immersed in the preparation to be frozen to a raised position in which the blade is lifted out of said preparation, the raising of the blade by its mounting means being controlled automatically by the torque generated on the blade by the hardening of the ice in the course of setting.

2. A device according to claim 1, including a fruit squeezer cone adapted to the drive of the motor drive-reduction device to enable fruit juices to be prepared, the base of the aforesaid cone being surrounded by a ring-shaped container said ring-shaped container being complete, and retaining the fruit juices, the pulp being retained by a ring-cone surrounding the base of the said cone.

3. A device according to claim 1, wherein the end of the arm includes two forks between which the blade support is fitted by means of a swivel shaft, a coaxial compression spring being interposed between one of the forks and the said support, it being possible for the said support to move on the said shaft in opposition to the spring to cause the blade arm to be raised by angular displacement about said swivel shaft.

4. A device according to claim 3, wherein the mixer blade support can be angularly displaced between two extreme locking positions about 90° apart.

5. A device according to claim 3, wherein the axis of the two forks is offset with respect to the axis of symmetry of the arms by a predetermined distance, in order to permit a maximum movement in the hinging of the blade arm rearwardly.

6. A device according to claim 5, wherein the swivel axis of the blade arm makes a predetermined angle with the axis of the blade arm.

7. A device according to claim 3, wherein the swivel shaft is detachable from the two forks.

8. A device according to claim 1, wherein the arm carries supports for two types of blades, one being a mixer blade lying in an inclined plane located at the bottom of the tank, the other being a toothed scraper, lying in a substantially vertical plane.

9. A device according to claim 1, wherein the internal cylindrical wall of the tank includes a rim on which removably fits the corresponding upper peripheral rim of the motor drive-reduction device.

10. A device according to claim 1, intended for use in conjunction with a cold air circulation refrigerator fitted with a low temperature storage compartment, e.g. −18°C, the cold air supply for which is obtained from a fan positioned to pass air through a cold-producing element located adjacent the bottom wall of but outside the storage compartment, wherein the blade for whisking the preparation to be frozen has a U-shaped structure, the bridge of which lies in an inclined plane to scrape the bottom of the freezer tank, and at least one of the limbs of which scrapes the corresponding lateral side wall of the said tank.

11. A device according to claim 10, wherein the bottom of the tank has a series of holes with a diameter of the order of 3/10 mm.

12. A device according to claim 10, including a detachable cylindrical dividing-plate forming a division between two coaxial rings and which, after raising of the blades and withdrawal of the said dividing-plate, enables an ice-cream in two juxtaposed flavours to be obtained.

13. A device according to claim 12, wherein the tank includes a bottom with two parts on different levels, an intermediate raised edge connecting the two levels of the bottom to allow the cylindrical detachable dividing-plate to be fitted vertically.

14. A device according to claim 13, including a circular collar formed in relief in the bottom of the tank; coaxially with the tank axis.

15. A device according to claim 12, wherein the driving arm is connected to the respective supports in front of of each of the coaxial rings.

16. A device according to claim 10, wherein the wedging of the blade on the edge of the internal wall with which it cooperates is used to assist the raising of the blade, the plane of travel of the said blade being a secant to the said wall.

17. A device according to claim 1, wherein the torque generated on the blade by the hardening of the preparation in the course of setting is balanced by the direct action of a spring.

18. A device according to claim 12, wherein the end of the arm includes a swivel-pin on which the blade support swivels, a coaxial compression spring being interposed between one of the two ends of the said swivel-pin and the said blade support, it being possible for the support to move on the swivel-pin in opposition to the spring when the blade is raised.

19. A device according to claim 18, wherein the blade support can travel between locking positions about 90° around a circle.

20. A device according to claim 19, wherein the shafts of the swivel-pins on which the respective blade supports swivel, are located in different planes arranged on opposite sides of the axis of symmetry of the arm, the said arm being reversible on the connection means in such a way that the blades can effect mixing in the tank at levels of differing depths.

21. A device according to claim 1, including a fruit squeezer cone adapted to the drive of the motor drive-reduction device to enable fruit juices to be prepared and transferred directly to the freezer tank, the base of the aforesaid cone being surrounded by a ring-shaped container pierced with holes allowing the fruit juice to flow into the tank but retaining the pulp.

* * * * *